United States Patent [19]
White

[11] 3,888,590
[45] June 10, 1975

[54] GRATING MONOCHROMATOR

[76] Inventor: John U. White, Contentment Island Rd., Darien, Conn. 06820

[22] Filed: Apr. 10, 1974

[21] Appl. No.: 459,170

[52] U.S. Cl. ............................................. 356/101
[51] Int. Cl. ............................................. G01j 3/18
[58] Field of Search ............ 356/94, 99-101

[56] References Cited
UNITED STATES PATENTS
| | | | |
|---|---|---|---|
| 3,472,596 | 10/1969 | Mandelberg | 356/101 |
| 3,521,960 | 7/1970 | Newcomer | 356/101 |
| 3,749,498 | 7/1973 | Shimomura | 356/101 |

OTHER PUBLICATIONS
J. U. White et al., Journal of the Optical Society of Ameria, Vol. 47, 1957, pp. 358–367
McCubbin et al., Applied Optics, Vol. 1, No. 4, July 1962, pp. 431–436.

*Primary Examiner*—Ronald L. Wibert
*Assistant Examiner*—F. L. Evans
*Attorney, Agent, or Firm*—Curtis, Morris & Safford

[57] ABSTRACT

A monochromator having curved entrance and exit slits and a pair of curved diagonal mirrors respectively positioned a short distance in front of and in back of an intermediate dispersed image. The dispersed light is successively reflected by the two curved mirrors to reverse the sense of the dispersion without reversing the curvature of the image. In several advantageous embodiments the diagonal mirrors are interposed between two grating monochromators which are oriented in different planes and are arranged in additive relationship with each other. The grating magnification or reduction of the first monochromator is off-set by the grating magnification or reduction of the second monochromator, and the final slit image is substantially free from aberrations at all grating angles and at all points even along comparatively long slits.

22 Claims, 10 Drawing Figures

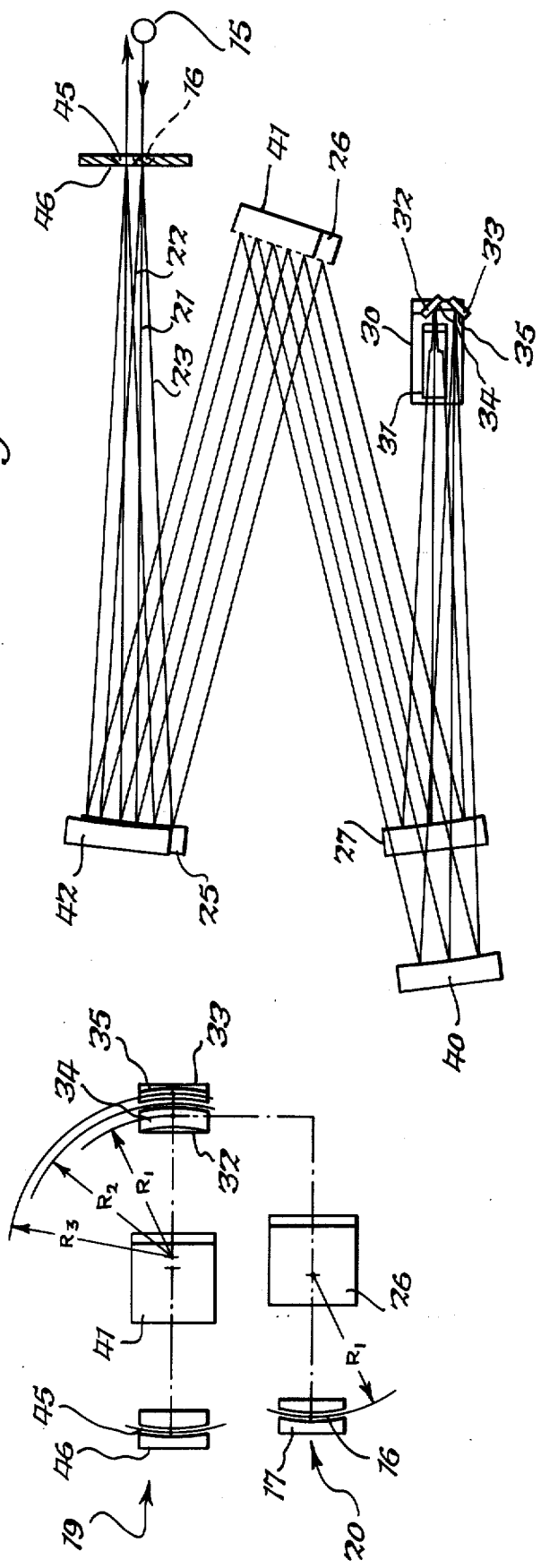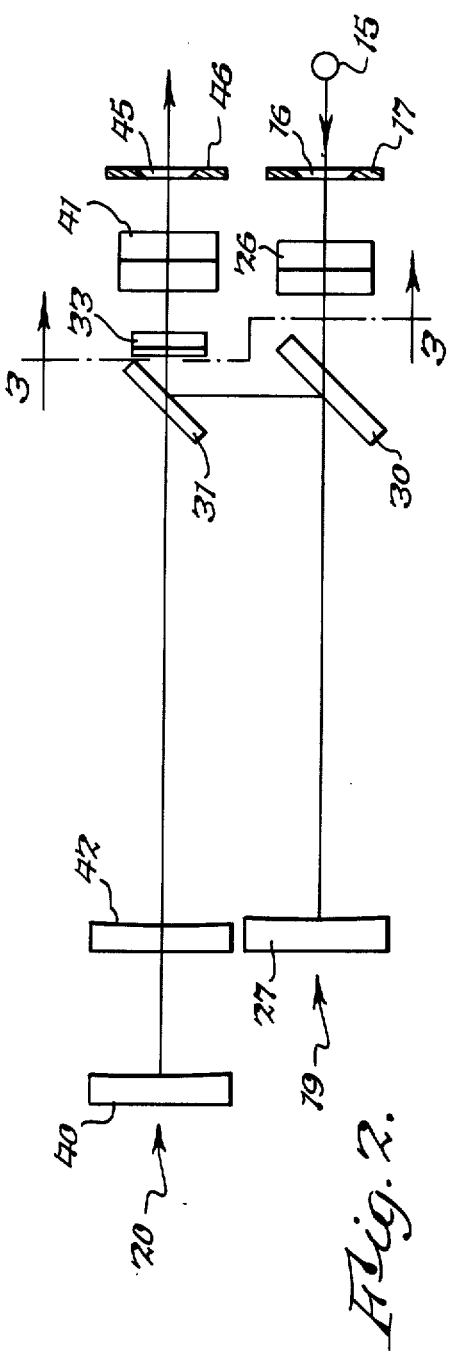

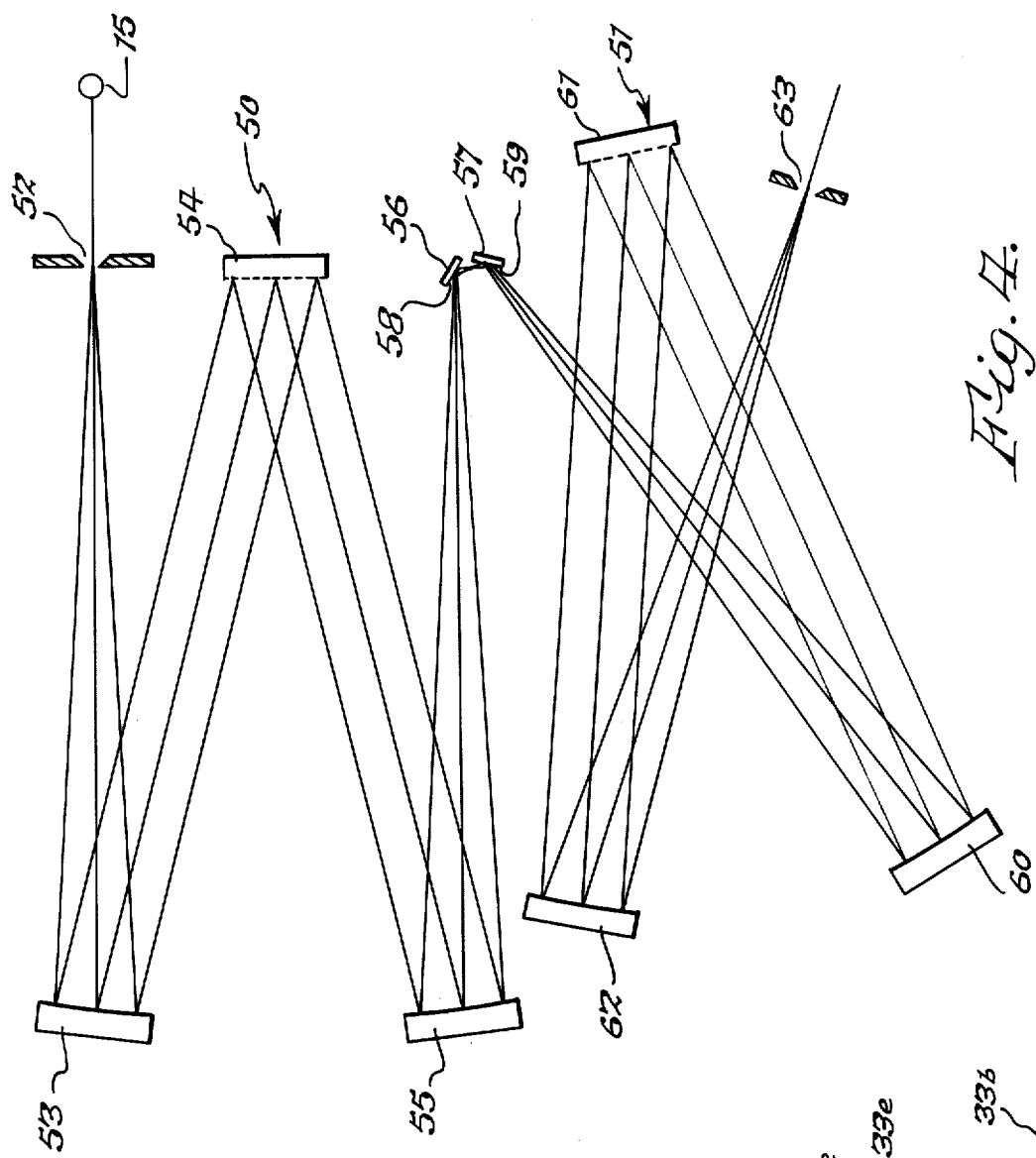
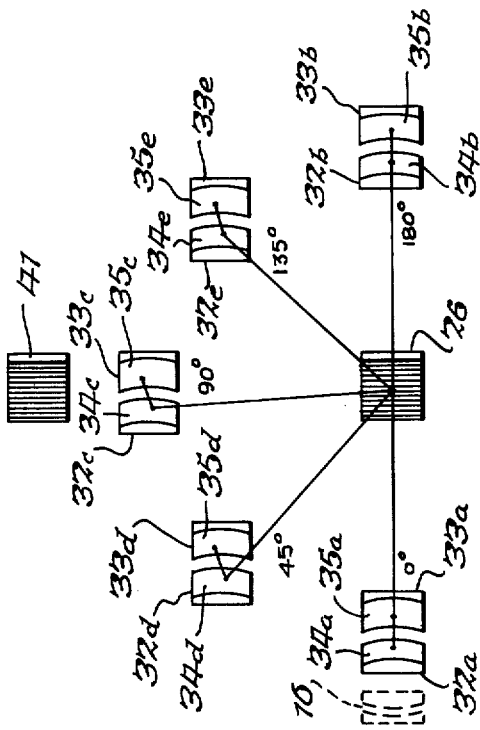

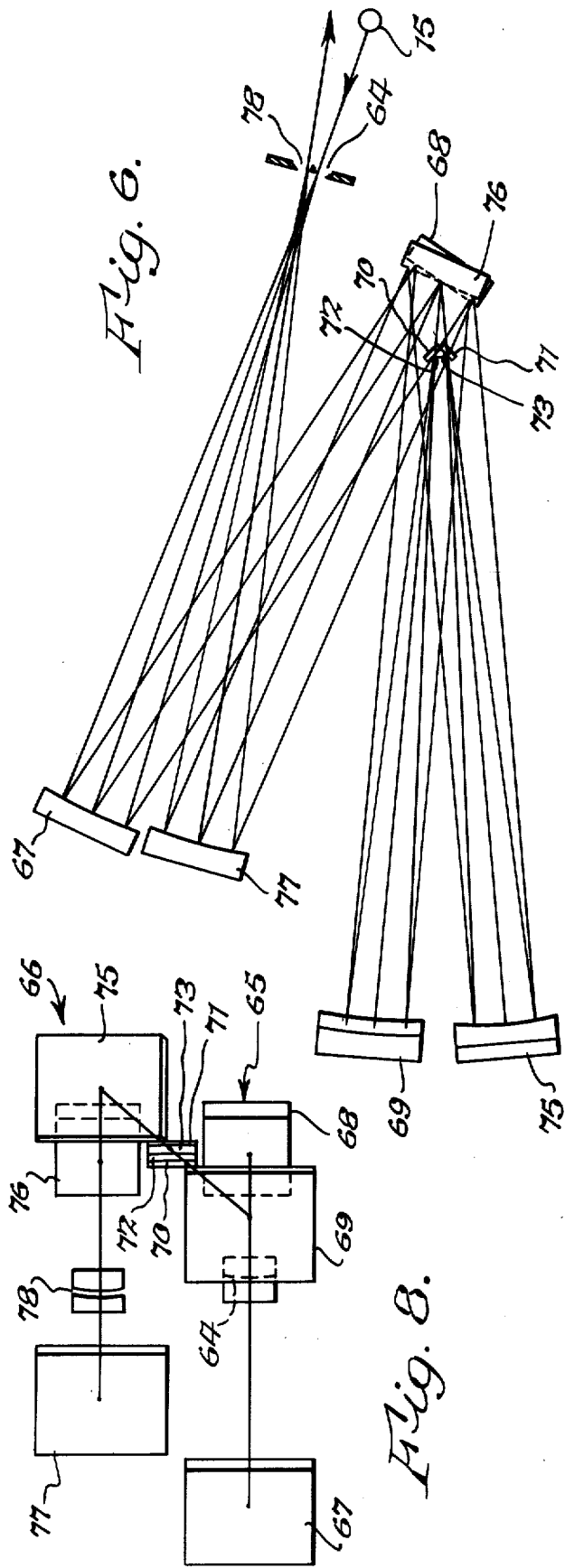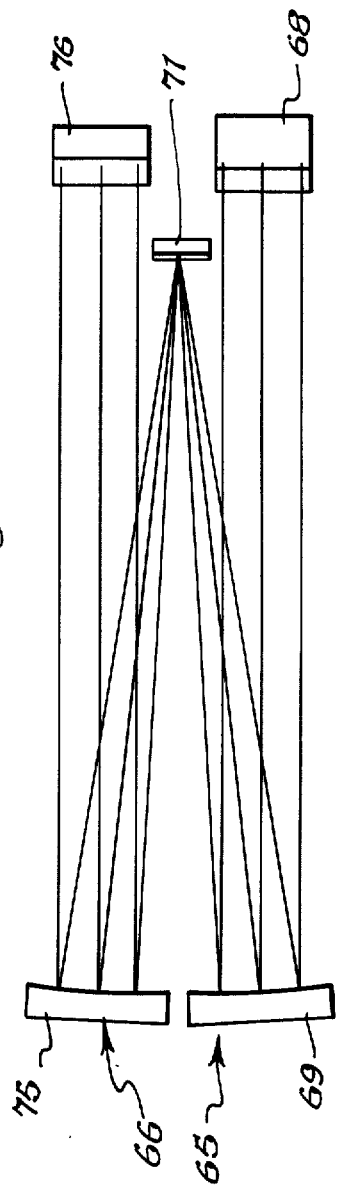

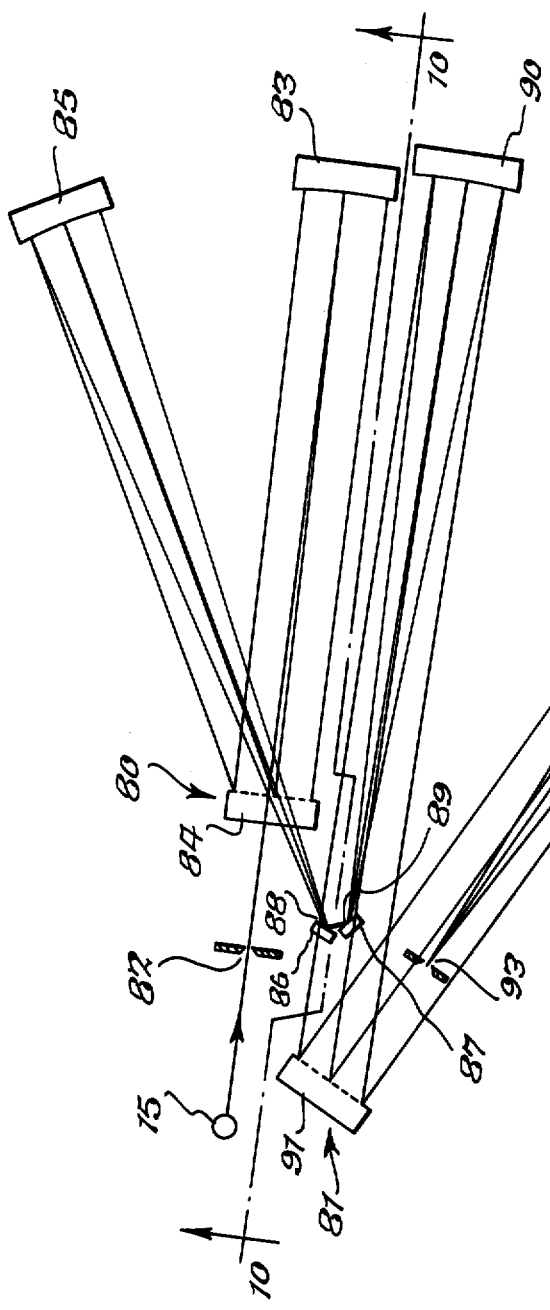
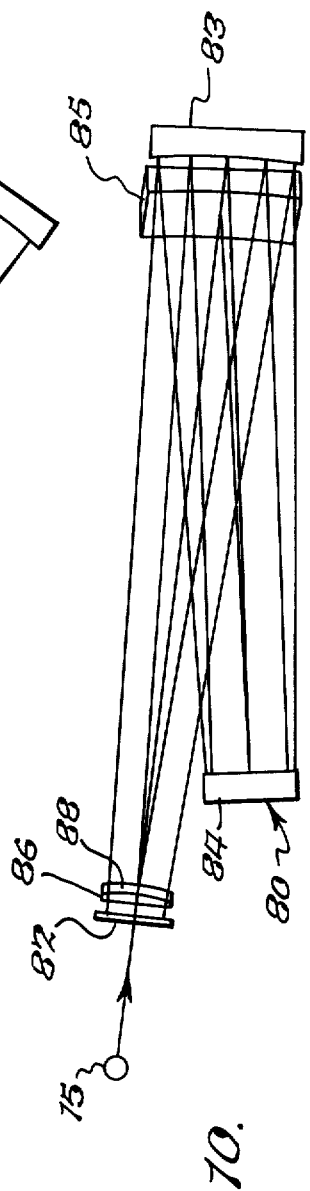

3,888,590

GRATING MONOCHROMATOR

BACKGROUND OF THE INVENTION

This invention relates to optical apparatus and more particularly to such apparatus for producing a portion of a spectrum.

The present invention, while of general application, is particularly well suited for use in monochromators. As will be understood, a monochromator commonly includes an entrance slit for admitting light from a source, a collimator, such as a mirror, a diffraction grating or other dispersing element, and a telescope mirror for forming a substantially monochromatic image of the entrance slit. Light entering from the entrance slit is reflected by the collimator, is dispersed into a spectrum by the dispersing element, and is re-formed into the dispersed image by the telescope, so that, by positioning a receiving element such as an exit slit relative to the dispersed image, a selected portion of the spectrum is obtained. (As used herein, the term "light" is not restricted to visible light but may include radiation having wavelengths longer or shorter than the visible spectrum). The dispersing element customarily is movable relative to the other optical components in order to change the angle of the light and thereby produce dispersed images of different portions of the spectrum.

Heretofore, monochromators and other image forming apparatus have exhibited several disadvantages. Of particular moment has been the difficulty in obtaining optimum resolution, particularly with monochromators utilizing comparatively long slits over a wide range of angles at the dispersing element. In cases in which a diffraction grating was used as the dispersing element, for example, the grating often introduced image distortion in the form of a curvature of the image of a straight entrance slit, and the severity of the curvature varied with wavelength. Although efforts were made to curve the exit slit to match the image, such matching only was achieved at one grating angle, and at other angles the length of the slit needed to be restricted in order to avoid loss of resolution by curvature mismatch.

Attempts have been made heretofore to correct the curvature mismatch problem by employing a large angle between the incident and diffracted light at the grating and by curving the entrance and exit slits to the form where image curvature is independent of grating angle. Such attempts, however, introduced another problem. The large grating angle resulted in a difference in width of the incident and diffracted light and produced magnification or reduction of the width of the entrance slit image. The grating magnification or reduction in itself did not affect resolution, but if other aberations such as coma prior to the grating were to be compensated for by opposite aberrations after the grating, the degree of compensation depended on the relative widths of the incident and diffracted light beams. Exact compensation of this character could be achieved only at one grating angle, and at other wavelengths the increasing coma gradually limited the obtainable resolution.

The coma prior to the diffraction grating for the most part was produced by the collimating mirror, while the compensating coma after dispersion was introduced by the telescope mirror. If off-axis sections of parabolic mirrors were used for the collimator and telescope, there was no coma along the optic axis. Off the optic axis, however, the degree of coma compensation still depended on grating magnification. The monochromators employed heretofore thus achieved theoretical resolution only with very short slits or only in a limited wavelength range.

Further attempts to achieve a solution to these problems involved the use of two monochromators for producing successive dispersions of the light. This created the possibility of correcting the aberrations of the first monochromator with the aberrations of the second, but here again the corrections were not completely successful. As an illustration, when the monochromators were arranged with the dispersions in additive relationship, the grating magnification was cumulative, of the slit image curvature varied with wavelength. When the dispersions were subtractive, on the other hand, the final image on occasion was sharp, but a good part of the resolving power was lost and the intermediate image exhibited poor resolution.

SUMMARY

One general object of this invention, therefore, is to provide new and improved apparatus for producing a portion of the spectrum.

More specifically, it is an object of this invention to provide such apparatus wherein the accuracy and resolution of the dispersed image is improved.

Another object of this invention is to reduce the adverse effects of aberrations in apparatus of this type.

Still another object of this invention is to provide apparatus of the character indicated in which the adverse effects of the aberrations are substantially eliminated over a wide range of angles at the dispersing element and at all points along the lengths of even comparatively long slits.

A still further object of this invention is to provide novel optical apparatus of comparatively simple construction which is economical to manufacture and thorougly reliable in operation.

In one illustrative embodiment of this invention, the apparatus includes curved entrance and exit slits and a pair of monochromators which are arranged to produce successive dispersions of the entrance slit image. Each monochromator includes a collimating mirror, a dispersing element such as a diffraction grating, and a telescope mirror. Light from the entrance slit proceeds to the collimating mirror in the first monochromator, then to the diffraction grating for a first dispersion, and then to the telescope mirror to form a curved image of a portion of the dispersed light. The light continues in similar fashion through the second monochromator for a second dispersion and is focused on the exit slit.

In accordance with one feature of the invention, a novel diagonal mirror arrangement is located between the two monochromators in spaced juxtaposition with the dispersed image formed by the first monochromator to reverse the sense of the first dispersion but without reversing the image curvature. With this arrangement, the resolution of the final image is extremely good and aberration free even with comparatively long entrance and exit slits.

In accordance with another feature of the invention, in certain particularly important embodiments, the mirror arrangement comprises a pair of curved reflecting surfaces which are respectively positioned a short distance in front of and in back of the dispersed image. The reflecting surfaces direct the image into the second monochromator with almost the same curvature it had when it left the first monochromator, and it is reimaged after the second dispersion on an exit slit substantially identical to the entrance slit.

In accordance with a further feature of several advantageous embodiments of the invention, the two monochromators are off-set from each other such that the plane defined by the optic axes at the dispersing means of the first monochromator is spaced from and parallel to the plane defined by the optic axes at the dispersing means of the second monochromator. A pair of flat diagonal mirrors receive the light from the first monochromator and cooperate with the novel curved reflecting surfaces to direct the light to the second monochromator for the second dispersion. The arrangement is such that any tendency of the first monochromator to change the width of the entrance slit image is off-set by the second monochromator, and the deleterious effects of grating magnification or reduction are substantially eliminated.

In accordance with a still further feature of the invention, in some embodiments, the coma necessarily introduced by the collimator and telescope in the first monochromator is additive but is opposite in sense to that introduced by the collimator and telescope in the second monochromator. As a result, the image at the exit slit of the apparatus is substantially coma free.

The present invention, as well as further objects and features thereof, will be understood more clearly and fully from the following description of certain preferred embodiments, when read with reference to the accompanying drawings.

BRIEF DESCRIPTION OF THE DRAWINGS

FIG. 1 is a simplified schematic plan view of apparatus for producing a portion of a spectrum in accordance with one illustrative embodiment of the invention.

FIG. 2 is a simplified schematic side elevational view of the apparatus shown in FIG. 1.

FIG. 3 is a simplified schematic end view of a portion of the apparatus as seen from the line 3—3 in FIG. 2.

FIG. 4 is a simplified schematic plan view of apparatus for producing a portion of a spectrum in accordance with another illustrative embodiment of the invention.

FIG. 5 is a simplified schematic end view similar to FIG. 3 but showing various alternative positions for the curved reflecting surfaces of the apparatus.

FIG. 6 is a simplified schematic plan view of apparatus for producing a portion of a spectrum in accordance with a third illustrative embodiment of the invention.

FIG. 7 is a simplified schematic side elevational view of a portion of the apparatus shown in FIG. 6.

FIG. 8 is a simplified schematic end elevational view of the apparatus of FIG. 6.

FIG. 9 is a simplified schematic plan view of apparatus for producing a portion of a spectrum in accordance with a fourth illustrative embodiment of the invention.

FIG. 10 is a simplified schematic side elevational view of the apparatus as seen from the line 10—10 in FIG. 9.

DESCRIPTION OF CERTAIN PREFERRED EMBODIMENTS

Referring to FIGS. 1-3 of the drawings, a pencil of light enters the apparatus from a suitable source 15 through a curved entrance slit 16 defined by a pair of jaws 17. The slit 16 has a substantial length in comparison with its width and a radius of curvature which advantageously is calculated in the manner described hereinafter. The entering light (visible of invisible) illustratively may be derived from or affected by a sample, the characteristics of which are to be determined. As an illustration, the sample itself may be caused to radiate, or light may be passed through it before or after passing through the apparatus.

The light entering through the entrance slit 16 passes successively through two grating monochromators 19 and 20 (FIG. 2) which illustratively are of the Ebert or Czerny-Turner type. The incoming light is represented schematically in FIG. 1 by a principal or axial ray 21 and two side rays 22 and 23. The rays of light pass through the entrance slit and are reflected by a spherically concave collimating mirror 25 in the monochromator 19 toward a dispersing element in the form of a diffraction grating 26. The angle of incidence of the axial beam of light at the collimator 25 is of the order of 7°.

The light rays 21, 22 and 23 are dispersed by the diffraction grating 26 and are received by a spherically concave telescope mirror 27. The mirror 27 focuses the dispersed light to form an astigmatic curved image of the entrance slit at a point between the monochromators 19 and 20. The included angle between the light rays falling on the grating 26 and the rays leaving the grating illustratively is 28°, and the angle of incidence of the light at the mirror 27 is one-quarter of the included angle at the grating or 7°.

Between the first monochromator 19 and the second monochromator 20 is a pair of diagonal mirrors 30 and 31. These mirrors have flat reflecting surfaces and serve to offset the light from the first monochromator well prior to the image point. Thus, the mirror 30 is oriented at a 45° angle with respect to the light from the first monochromator's telescope mirror 27 and directs the light vertically upward to the mirror 31. This latter mirror similarly is arranged at a 45° angle in parallel relationship with the mirror 30 to reflect the light along a path parallel to the light incident on the mirror 30 but at a different level.

Two diagonal coupling mirrors 32 and 33 are arranged in close juxtaposition with the image formed by the telescope mirror 27. The mirrors 32 and 33 are provided with curved reflecting surfaces 34 and 35 which are respectively positioned in spaced relationship with each other a short distance in front of and in back of the curved image formed by the mirror 27. In the embodiment of FIGS. 1-3, the reflecting surface 34 of the mirror 32 is spherically convex, while the reflecting surface 35 of the mirror 33 is spherically concave. The surfaces 34 and 35 together serve to send the light back in the direction from which it came and to reverse the sense of the dispersion of the spectrum with respect to the sense of the curvature of the image. That is, the effect of the surfaces 34 and 35 is to reverse the sense of the dispersion without reversing the image curvature. The surface 35 directs the light toward the collimator of the second monochromator 20.

The second monochromator 20 is similar to the first monochromator 19 except that the light proceeds in the opposite direction. Upon entering the monochromator 20, the light from the coupling mirror 33 is reflected by a spherically concave collimating mirror 40, corresponding to the telescope mirror 27 of the first monochromator 19, at an angle of incidence which illustratively is of the order of 7° for the axial beam. The thus collimated light proceeds to a diffraction grating 41 for a second dispersion which is in additive relationship with the initial dispersion by the diffraction grating 26. The included angle of the light rays at the grating 41 is four times the angle of incidence at the collimator 40 or 28°.

The light dispersed by the diffraction grating 41 is reflected by a spherically concave telescope mirror 42 at an angle of incidence of 7°. The mirror 42 focuses the light on a curved exit slit 45 defined by a pair of jaws 46. Like the entrance slit 16, the exit slit 45 is comparatively long and has a length which is many times its width. The slit 45 is curved to match the curvature of the dispersed image of the slit 16 so that the light passing through it is substantially monochromatic in character.

It will be noted from FIG. 1 that the diagonal correcting mirrors 32 and 33 have their reflecting surfaces 34 and 35 facing toward each other such that the principal or axial light ray leaving the surfaces is on the same side as the axial light ray approaching the surfaces. The light proceeds through the second monochromator 26 in a direction opposite to the direction of the light passing through the first monochromator 19. The axial rays of the incident and dispersed light at the first diffraction grating 26 lie in a substantially flat plane which is parallel to but spaced from the axial rays of the incident and dispersed light at the second diffraction grating 41. The light strikes the second grating 41 from the direction in which it left the first grating 26. With this arrangement, when both gratings are rotated in the same direction to make their dispersions additive, magnification or reduction by the first grating is opposite to that by the second grating, and the two together cause no net magnification or reduction at any grating angle. As a result, the width of the light beam is independent of wavelength.

The diagonal mirrors 32 and 33 are effective to return the curved entrance slit image formed by the first telescope mirror 27 back toward the second collimating mirror 40 with the concave side of the image toward the diffraction grating 41 and with almost the same radius of curvature, thus enabling the image to be reimaged on the exit slit 45 with the image's concave side toward the grating 41. The convex spherical surface 34 of the mirror 32 advantageously has a radius of curvature equal to $\sqrt{2}$ multiplied by the radius of curvature of the image falling on it. The concave spherical surface 35 of the mirror 33, on the other hand, has a radius of curvature which is larger than that of the surface 34 by $\sqrt{2}$ multiplied by the axial separation between the two surfaces. With the mirrors 32 and 33 in close juxtaposition with each other, there is very little change in the curvature of the image being introduced into the second monochromator, and the curvature of the final image is essentially independent of wavelength.

The mirrors 32 and 33 are spaced apart at a ninety degree angle with respect to each other. Referring to FIG. 3, where the collimating and telescope mirrors all have the same focal length, if the mirror surfaces were to be extended their common intersection would be a segment of a circle of radius $R_2$ around the diffraction grating 41. If F is the focal length of the collimator 40 (FIG. 2) and $\phi$ is onehalf the included angle of the light rays at the grating 41, for optimum results the radius $R_2$ is calculated as follows:

$$R_2 = F \tan \phi$$

If the entrance slit 16 has a radius $R_1$ around the grating 41 and the exit slit 45 has a radius $R_3$ around the grating, then $$R_1 = R_2 - s/2$$

and $$R_3 = R_2 + s/2$$

were $s$ is the axial separation between the reflecting surfaces 34 and 35.

The entrance slit radius is thus smaller than $F \tan \phi$ by one-half of the axial separation between the surfaces 34 and 35, and the exit slit radius is larger than $F \tan \phi$ by the same amount. For the two together, variation of image curvature with wavelength is eliminated. The principal ray from each point along the length of the entrance slit strikes the surface 34 at the same distance from its image point, is reflected radially outward through the image point to the reflecting surface 35, and is then reflected back into the direction from which it came. The light leaving the surface 35 comes from a virtual slit image surrounding the real image that was projected into the surface 34. The radius of curvature of this light is larger than that projected into the surface 34 by a distance equal to the separation between the two surfaces. The slits and the surfaces have complete circular symmetry, and any aberrations resulting from the surfaces are the same for all points along the slit length.

It is well known that, when spherical mirrors are used in the Ebert and Czerny-Turner forms of monochromators, coma introduced by the collimating mirror is to a large extent compensated by coma of the opposite sense introduced by the telescope mirror. By judicious choice of the focal lengths and/or angles of incidence of these two mirrors, the compensation can be made essentially complete in any limited spectral region. Coma increases progressively at wavelengths further and further removed from this region. When the focal length of either telescope mirror is longer or shorter than that of its associated collimator, the radius of curvature of the image formed by it is correspondingly longer or shorter, and this difference in curvature must be taken into account in determining the radii of the slits and coupling mirrors. In the arrangement illustrated in FIGS. 1–3, at wavelengths where there is residual coma in the first monochromator 19, there is also residual coma in the second monochromator 20, and the two are additive.

In a modification of the double monochromator arrangement of FIGS. 1–3, off-axis sections of parabolic mirrors are substituted for the spherical collimating mirrors 25 and 40 and the spherical telescope mirrors 27 and 42. One advantage of this modification is that there is neither spherical aberration nor coma at the axial image points. Off the axis the coma introduced by the collimating mirror 25 and the telescope mirror 27 is additive but is opposite in sense from that resulting from the collimating mirror 40 and the telescope mirror 42. The coma from the second monochromator thus offsets that from the first monochromator, and the final exit slit image is substantially coma free.

In the embodiment of FIGS. 1–3 two separate monochromators are employed to provide successive dispersions of light from the source 15. This same result is achieved in other embodiments by double passing a single monochromator. In these latter arrangements the same monochromator 20 and the offsetting mirrors 30 and 31 are omitted, and the coupling mirrors 32 and 33 are oriented in position to return the dispersed light back into the monochromator 19 after its initial pass. A diagonal mirror such as the mirror 30, for example, may be employed to separate the emerging and entering beams.

FIG. 4 is illustrative of a double monochromator in which the principal light ray in both monochromators lies in a single flat plane. This latter embodiment includes a first monochromator 50 and a second monochromator 51 which are oriented in side by side relationship with each other. Light from the source 15 enters the first monochromator 50 through a curved entrance slit 52 and is received by a spherically concave collimating mirror 53 at an angle of incidence which illustratively is of the order of 7°. The collimated light proceeds from the mirror 53 to a diffraction grating 54 for a first dispersion and then to a spherically concave telescope mirror 55. The angle of incidence of the light at the mirror 55 likewise is 7°, while the included angle at the grating 54 is 28°.

The telescope mirror 55 focuses the light at a point intermediate two diagonal coupling mirrors 56 and 57 to form a curved image of a portion of the light dispersed by the diffraction grating 54. The coupling mirrors 56 and 57 respectively include curved reflecting surfaces 58 and 59 of a configuration and arrangement similar to that described heretofore. These surfaces are positioned in spaced relationship with each other a short distance in front of and in back of the curved length. The arrangement is such that the light leaving the surface 59 is on the same side of the mirrors as the light approaching the surface 58. The dispersed light from the first monochromator 50 is successively reflected by the surfaces 58 and 59 to reverse the sense of the dispersion with respect to the sense of the curvature of the image. In this arrangement the axial ray leaving the coupling mirrors 56 and 57 diverges from the entering ray instead of being parallel to it. In this case the radii of curvature of the convex mirror 56 and the concave mirror 57 are increased from the values given above in proportion to the sines of the corresponding angles at incidence of the light on the two mirrors.

The second monochromator 51 is similar to the first monochromator 50 except for the reversal of the relative positions of its collimator and telescope compared to the collimator and telescope of the first monochromator 50. The surface 59 of the coupling mirror 57 directs the entering light across all the dispersed beams to the far side of the second monochromator. The light is received by a spherical collimating mirror 60 within the monochromator 51 and is reflected toward a diffraction grating 61. The angle of incidence of the axial light at the collimating mirror 60 illustratively is 7°, and the included angle of the light at the grating 61 is 28°.

The grating 61 produces a second dispersion of the light and directs it to a concave toroidal telescope 62, again at an angle of incidence of 7°. The mirror 62 forms a curved dispersed image of the entrance slit 52 at the exit slit 63. The relationship between the radii of curvature of the entrance slit 52, the exit slit 53 and the curved image between the reflective surfaces 58 and 59 is the same as that described heretofore.

As explained above for the first monochromator, coma introduced by the second collimating mirror 60 is compensated by coma introduced by the second telescope mirror 62. The effect of the reversal of the positions of the collimating and telescope mirrors in the second monochromator is to reverse the sense of these two comatic aberrations and at wavelengths outside the region of optimum compensation to reverse the sense of the uncompensated residual coma. The combined residual coma of the two monochromators is then the difference of the residuals instead of the sum. The beam of light incident on the second grating 61 strikes it at the same angle from the same direction in which the beam left the first grating 54. As the two diffraction gratings must rotate in the same direction to make their dispersions additive, magnification or reduction from the one grating is equal and opposite to and canceled by that from the second grating. For the two monochromators together, the net magnification is zero and the coma compensation is the same at all wavelengths.

It is well known to those skilled in the art that the Ebert monochromator forms a highly astigmatic image and that the orientation of the astigmatic lines varies along the length of the exit slit. To achieve sharp focus along the greatest possible length of slit, the exit slit is curved to lie parallel to the direction of the astigmatic lines at each point on the exit slit. The entrance slit is then formed to the curve that is imaged on the exit slit. The proper slit curvature to achieve this result lies along a circle around the grating, the radius of the circle being F tan $\alpha$, where F is the common focal length of the collimator and telescope mirrors and $\alpha$ is twice the angle of incidence on the collimator. In the Ebert monochromators the angle $\alpha$ is equal to the angle $\phi$ discussed above, and the radius of slit curvature that makes the astigmatic lines lie parallel to the exit slit is the same one that makes the image curvature at the exit slit independent of wavelength. In the Czerny-Turner monochromator the angles $\alpha$ and $\phi$, while not always quite equal, are nearly enough equal to permit a close approximation to both these results. If the focal length of the telescope mirror is different from that of the collimator, the optimum radius of curvature of the exit slit is the radius of curvature and the entrance slit multiplied by the ratio of the focal length of the telescope mirror to the focal length of the collimator.

In the second monochromator 51, which is different from the Ebert form of the first monochromator 50, the conditions for the formation at the exit slit 63 of an entrance slit image whose curvature is independent of wavelength are that $F_1 = R/\tan \phi$, where $F_1$ is the focal length of the second collimator and R is now the radius of curvature of the virtual slit image formed by the concave mirror 59, and that the virtual slit image be concave away from the grating 61 instead of toward it. The image formed at the exit slit 63 is also concave away from the grating. on the optic axis the orientation of the astigmatic line image at the exit slit is always parallel to the exit slit regardless of the amount of toroidal power in the telescope mirror 62. With very little toroidal power in the mirror 62, the orientation of the astigmatic line images at the exit slit of points on the entrance slit rotates in the same direction as in the Ebert monochromator, that is, parallel to a circle around the grating and not parallel to the curved image of the entrance slit. With increasing toroidal power in the mirror 62, the axial image at the exit slit 63 becomes stigmatic, and near the optic axis the astigmatic lines are so short that the image is not appreciably broadened by them even though they are not parallel to the curve of the exit slit. With still more toroidal power in the mirror 62, the point of minimum astigmatism falls out along the image at the exit slit, and image broadening by astigmatism is negligible over a great length of slit. The final image is substantially free from aberration except possibly spherical aberration which also is negligible when comparatively long focal lengths are used for the concave mirrors.

FIG. 5 is a schematic representation of various alternative locations for the curved reflecting surfaces 35 and 36 of the diagonal coupling mirrors 33 and 34. The figure represents an end view looking at the gratings 26 and 41 from the direction of the light leaving the first grating 26 and proceeding toward the first telescope mirror (not shown in FIG. 5 but illustrated at 27, for example, in FIG. 2). The first telescope mirror may be tilted to direct the light in any direction relative to the light incident thereon toward the coupling mirrors, and the coupling mirrors may be located anywhere within reason around the grating 26. The figure illustrates five coupling mirror locations together with the orientation of the light beams reflected by the telescope mirror.

In cases in which the optical axes of the diagonal coupling mirrors are positioned in the plane of the principal rays of the incident and diffracted light at the grating 26, the coupling mirrors may be located adjacent the entrance slit 16 at the 0° position, as illustrated by the mirrors 32a and 33a and their corresponding reflecting surfaces 34a and 35a, or they may be located opposite the slit 16 at the 180° position, as illustrated by the mirrors 32b and 33b and their corresponding reflecting surfaces 34b and 35b. For double monochromator systems with the coupling mirrors in the 0° or 180° positions, suitable off-setting mirrors are employed, such as the mirrors 30 and 31 of FIGS. 1–3, for example, to separate the light at the second grating 41 from that at the first grating 26. If off-axis parabolic mirrors are employed for the collimators and telescopes in the two monochromators, there is little comatic aberrations in the final image.

The diagonal coupling mirrors also may be located directly between the gratings 26 and 41 at the 90° position, as illustrated by the mirrors 32c and 33c and their corresponding reflecting surfaces 34c and 35c. The coupling mirrors similarly may be located at points intermediate the horizontal and vertical positions, as illustrated by the mirrors 32d and 33d and their corresponding reflecting surfaces 34d and 35d at the 45° position and by the mirrors 32e and 33e and their corresponding reflecting surfaces 34e and 35e at the 135° position. These arrangements enable the tilting of the telescope mirror in the first monochromator, the coupling mirrors and the collimating mirror in the second monochromator in a way which eliminates the need for offsetting mirrors. In addition, they permit convenient location of the entrance and exit slits and provide a final image which is substantially aberration free particularly in cases in which the collimators and telescopes comprise off-axis paraboloids. The location of the coupling mirrors may be varied over a wide range depending upon the particular design of the instrument and its function.

FIGS. 6–8 are illustrative of a double monochromator in which the telescope mirror in the first monochromator is tilted to direct the dispersed light out of the first monochromator's optical plane to the position indicated as 90° in FIG. 5. In these figures light enters through a curved entrance slit 64 and passes successively through two monochromators 65 and 66. The light from the slit 64 is received by an off-axis parabolic collimating mirror 67 in the first monochromator 65 and is directed toward a diffraction grating 68. The grating 68 disperses the light, and it is then reflected by an off-axis telescope mirror 69. As best illustrated in FIG. 7, the mirror 69 is tilted slightly to direct the light in an angularly upward direction.

A pair of diagonal coupling mirrors 70 and 71 is located a short distance above the diffraction grating 68. The mirrors 70 and 71 are provided with curved reflecting surfaces 72 and 73, respectively, which are angularly disposed in spaced relationship with each other a short distance in front and in back of the curved image formed by the first telescope mirror 69. The dispersed light from the telescope mirror 69 is successively reflected by the surfaces 72 and 73 to reverse the sense of the dispersion with respect to the curvature of the telescope image. As in the previously described embodiments, the light leaving the surfaces 72 and 73 is on the same side of the surfaces as the light which approaches the surfaces.

The light reflected by the curved reflecting surface 73 of the coupling mirror 71 proceeds in an angularly upward direction to the second monochromator 66. The light is received by an off-axix parabolic collimating mirror 75 within the monochromator 66 and is directed to a second diffraction grating 76 for a final dispersion and then to an off-axis parabolic telescope mirror 77. The grating 76 is located a short distance above the diagonal coupling mirrors 70 and 71. The telescope mirror 77 focuses the light to a curved dispersed image of the entrance slit 64 at a curved exit slit 78.

The double monochromator of FIGS. 6–8 exhibits the same general characteristics and aberration cancellation features as the embodiment of FIGS. 1–3 using off-axis parabolic mirrors, and it has the additional advantage that there are fewer reflections of the light.

FIGS. 9 and 10 are illustrative of still another embodiment of the double monochromator. The apparatus shown in these figures includes a first monochromator 80 and a second monochromator 81 which produce successive dispersions of light from the source 15. The light enters the apparatus through a curved entrance slit 82 and proceeds toward an off-axis parabolic collimating mirror 83 in the monochromator 80. The mirror 83 is tipped slightly to direct the collimated light to a first diffraction grating 84 which is located in line with but a short distance beneath the light entering the entrance slit. The grating 84 is tipped in the opposite direction such that the dispersed light therefrom follows a diagonally upward path to an off-axis parabolic telescope mirror 85 at the level of the collimator 83. As in the embodiments described heretofore, the telescope mirror 85 forms a curved image of a portion of the dispersed light.

The light from the telescope mirror 85 is directed over the first grating 84 and is received by two diagonal coupling mirrors 86 and 87. These mirrors respectively include curved reflecting surfaces 88 and 89 which are positioned such that the dispersed image from the telescope mirror is located midway between the two surfaces. The surfaces successively reflect the light to reverse the sense of the dispersion without reversing the curvature of the image.

From the reflecting surface 89 the light enters the second monochromator 81 and is received by an off-axis parabolic collimating mirror 90. The mirror 90 is tipped slightly downward to direct the light to a second diffraction grating 91 for a second dispersion in additive relationship with the first dispersion. The grating 91 is located in line with but a short distance beneath the extended path of the light coming from the mirror 87. The grating 91 is tipped in the opposite direction such that the light therefrom follows a diagonally upward path to the off-axis parabolic telescope mirror 92 at the level of the collimator 90. The mirror 92 focuses the dispersed light on a curved exit slit 92 to form a curved dispersed image of the entrance slit 82 at the exit slit.

It will be noted that the incoming light from the entrance slit 82 passes over the first diffraction grating 84 and is located at the level of the diagonal coupling mirrors 86 and 87. Light from the entrance slit strikes the collimating mirror 83 at a small acute angle to the plane defined by the principal rays of the incident and dispersed light at the first grating 84, and light leaving the telescope mirror 85 leaves at the same angle to the same plane. In the second monochromator light from the coupling mirrors strikes the collimating mirror 90 at a small acute angle to the plane defined by the principal rays of the incident and dispersed light at the grating 91, and light leaving the second telescope mirror 92 leaves the same small acute angle to the same plane. This arrangement provides an extremely compact structure and results in a final image which is almost entirely aberration free.

Although the diagonal coupling mirrors in the illustrated embodiments are of spherical form, the mirrors may be provided with various other types of curved surfaces. As an illustration, in some advantageous arrangements the mirrors are of conical or cylindrical configuration tangent to the spherical surfaces at the axial intersection points and with radii of curvature of the intersection points equal to those of the spherical mirrors described above. Various other modifications in the construction of the mirrors will suggest themselves to those skilled in the art upon a perusal of the foregoing description.

The convex reflecting surfaces 34 of the diagonal coupling mirror 32 in FIGS. 1-3, for example, is located adjacent the first monochromator 19, and the concave reflecting surface 35 of the diagonal coupling mirror 33 is located adjacent the second monochromator 20. The radii of curvature of the surfaces 34 and 35 are such that, by rotation of the surfaces as a unit about a vertical axis, the plane defined by the axial ray and the slit image between the surfaces can intersect the convex surface 34 in a curve whose curvature is approximately equal to the curvature of the slit image formed by the first monochromator 19 and simultaneously can intersect the concave surface 35 in a curve whose curvature is approximately equal to the curvature of the slit image formed by the second monochromator 20. By maintaining this arrangement, the final image is extremely well defined and substantially aberration free.

The terms and expressions which have been employed are used as terms of description and not of limitation, and there is not intention, in the use of such terms and expressions, of excluding any equivalents of the features shown and described, or portions thereof, it being recognized that various modifications are possible within the scope of the invention claimed.

What is claimed is:

1. Apparatus for producing a portion of a spectrum, comprising, in combination:

means forming a curved entrance slit for admitting light from a source;

means forming a curved exit slit;

first grating monochromator means for dispersing the light admitted through the entrance slit and for forming a curved first dispersed image of the entrance slit;

second grating monochromator means for receiving light from the first monochromator means and again dispersing the same to form a curved second dispersed image of the entrance slit at the exit slit, the successive dispersions by the first and second monochromator means being in additive relationship with each other; and mirror means located between the first and second grating monochromator means and including a convex reflecting surface and a concave reflecting surface for reversing the sense of the first dispersion with respect to the sense of the curvature of the first image, the curvature of the second image being substantially independent of wavelength.

2. Apparatus as defined in claim 1, in which one of the reflecting surfaces is located adjacent the first monochromator means and the other reflecting surface is located adjacent the second monochromator means, the reflecting surfaces being such that, by rotation of the surfaces as a unit, the plane defined by the slit image and the axial ray between the surfaces can intersect the convex surface in a curve whose curvature is approximately equal to the curvature of the slit image formed by the monochromator means adjacent the convex surface and simultaneously can intersect the concave surface in a curve whose curvature is approximately equal to the curvature of the slit image formed by the monochromator means adjacent the concave surface.

3. Apparatus as defined in claim 1, in which the light leaves the reflecting surfaces on the same side of the surfaces as the light approaching the surfaces.

4. Apparatus for producing a portion of a spectrum, comprising, in combination:

means forming a curved entrance slit for admitting light from a source;

means forming a curved exit slit;

first grating monochromator means for dispersing the light admitted through the entrance slit and for forming a curved first image of the entrance slit;

second grating monochromator means for receiving light from the first monochromator means and again dispersing the same to form a curved second image of the entrance slit at the exit slit, the successive dispersions by the first and second monochromator means being in additive relationship with each other; and mirror means located between the first and second grating monochromator means and including a convex reflecting surface and a concave reflecting surface respectively positioned in spaced relationship with each other a short distance in front of and in back of the curved first image for reversing the sense of the first dispersion with respect to the curvature of said first image, the curvature of the second image being substantially independent of wavelength.

5. Apparatus as defined in claim 4, in which the dispersed light from the first monochromator means is successively reflected by the reflecting surfaces, the light leaving the reflecting surfaces being on the same side of the surfaces as the light approaching the surfaces.

6. Apparatus as defined in claim 5, in which the reflecting surfaces are angularly disposed with respect to the approaching and leaving light.

7. Apparatus as defined in claim 5, wherein the curvature of the entrance slit is such that the curvature of the first dispersed image is substantially independent of wavelength, and the curvature of the exit slit is equal to that of the second dispersing image.

8. Apparatus for producing a portion of a spectrum, comprising, in combination:

means forming a curved entrance slit for admitting light from a source, the entrance slit having a substantial length in comparison with its width;

means forming a curved exit slit;

a first grating monochromator for dispersing the light admitted through the entrance slit and for forming a curved first image of the entrance slit;

a second grating monochromator for receiving light from the first monochromator and again dispersing the same to form a curved second image of the entrance slit at the exit slit, the successive dispersions by the first and second monochromators being in additive relationship with each other;

light directing means for coupling the dispersed light of the first monochromator with the second monochromator; and mirror means located between the first and second grating monochromator means and including a pair of curved reflecting surfaces positioned in spaced relationship with each other adjacent the curved first image formed by the first monochromator, the dispersed light from the first monochromator being successively reflected by said surfaces to reverse the sense of the dispersion with respect to the curvature of said curved first image.

9. Apparatus as defined in claim 8, wherein the entrance slit has a radius of curvature such that the curvature of the first dispersed image is substantially independent of wavelength, and the exit slit has a radius of curvature equal to that of the second dispersed image.

10. Apparatus for producing a portion of a spectrum, comprising, in combination:

means forming a curved entrance slit for admitting light from a source;

means forming a curved exit slit;

first monochromator means including a first collimator, a first diffraction grating and a first telescope, the first collimator receiving light from the entrance slit and directing the same to the diffraction grating for a first dispersion, the first telescope forming a curved first image of the entrance slit;

second monochromator means including a second collimator, a second diffraction grating and a second telescope, the second collimator receiving light from the first monochromator means and directing the same to the second diffraction grating for a second dispersion in additive relationship with the first dispersion, the second telescope forming a curved second image at the exit slit; and mirror means including a convex reflecting surface and a concave reflecting surface positioned in spaced relationship with each other adjacent the curved first image formed by the first monochromator means, the dispersed light from the first monochromator means being successively reflected by said surfaces to reverse the sense of the dispersion with respect to the sense of the curvature of said curved first image, the curvature of the second image being substantially independent of wavelength.

11. Apparatus for producing a portion of a spectrum, comprising, in combination:

means forming a curved entrance slit for admitting light from a source;

means forming a curved exit slit;

first monochromator means including a first collimator, a first diffraction grating and a first telescope, the first collimator receiving light from the entrance slit and directing the same to the first diffraction grating for a first dispersion, the first telescope forming a curved first image of the entrance slit, the principal rays of the incident and dispersed light at the first diffraction grating lying in a first substantially flat plane, the first grating tending to change the width of the first image with respect to the width of the entrance slit;

second monochromator means including a second collimator, a second diffraction grating and a second telescope, the second collimator receiving light from the first monochromator means and directing the same to the second diffraction grating for a final dispersion in additive relationship with the first dispersion, the second telescope forming a curved second image at the exit slit, the principal rays of the incident and dispersed light at the second diffraction grating lying in a second substantially flat plane which is spaced from said first plane, the second grating offsetting the tendency of the first grating to change the width of the first image; and mirror means including a convex reflecting surface and a concave reflecting surface respectively positioned in spaced relationship with each other a short distance in front of and in back of the curved first image formed by the first monochromator means, the dispersed light from the first monochromator means being successively reflected by said surfaces to reverse the sense of the dispersion with respect to the curvature of said curved first image, the curvature of the second image being substantially independent of wavelength.

12. Apparatus as defined in claim 11, in which the first and second planes are located in parallel relationship with each other.

13. Apparatus as defined in claim 12, in which the mirror means is located between the first and second planes.

14. Apparatus for producing a portion of a spectrum, comprising, in combination:
means forming a curved entrance slit for admitting light from a source;
means forming a curved exit slit;
first monochromator means including a first collimating mirror, a first diffraction grating and a first telescope mirror, light from the entrance slit being received by the first collimating mirror and being directed to the first diffraction grating for a first dispersion and then to the first telescope mirror, to form a curved first image of the entrance slit, the first grating tending to change the width of the first image with respect to the width of the entrance slit;
second monochromator means including a second collimating mirror, a second diffraction grating and a second telescope mirror, light from the first monochromator means being received by the second collimating mirror and being directed to the second diffraction grating for a final dispersion in additive relationship with the first dispersion, then to the second telescope mirror, and then toward the exit slit, to thereby form a curved second image at the exit slit, the second grating offsetting the tendency of the first grating to change the width of the first image; and
mirror means located between the first and second monochromator means and including a convex reflecting surface and a concave reflecting surface respectively positioned in spaced relationship with each other a short distance in front of and in back of the curved first image formed by the first monochromator means, the dispersed light from the first monochromator means being successively reflected to said surfaces to reverse the sense of the dispersion with respect to the curvature of said curved first image, the light leaving the mirror means diverging with respect to the light approaching the mirror means and being directed thereby across the path of the dispersed light from the second collimating mirror to the second diffraction grating.

15. Apparatus as defined in claim 14, in which at least one of the mirrors in the second monochromator means has a toroidal reflecting surface.

16. Apparatus for producing a portion of a spectrum, comprising, in combination:
means forming a curved entrance slit for admitting light from a source;
means forming a curved exit slit;
first monochromator means including a first collimating mirror, a first diffraction grating and a first telescope mirror, light from the entrance slit being received by the first collimating mirror and being directed to the first diffraction grating for a first dispersion and then to the first telescope mirror, to form a curved first image of the entrance slit, the principal rays of the incident and dispersed light at the first diffraction grating lying in a first substantially flat plane which meets the principal rays from the entrance slit to the first collimating mirror and from the first telescope mirror to the first dispersed image at acute angles, the first grating tending to change the width of the first image with respect to the width of the entrance slit;
second monochromator means including a second collimating mirror, a second diffraction grating and a second telescope mirror, light from the first monochromator means being received by the second collimating mirror and being directed to the second diffraction grating for a second dispersion in additive relationship with the first dispersion, then to the second telescope mirror, and then toward the exit slit, to thereby form a curved second image at the exit slit, the principal rays of the incident and dispersed light at the second diffraction grating lying in a second substantially flat plane which meets the principal rays from the first and to the second dispersed images at acute angles, the second grating offsetting the tendency of the first grating to change the width of the first image; and
mirror means including a convex reflecting surface and a concave reflecting surface respectively positioned in spaced relationship with each other a short distance in front of and in back of the curved first image formed by the first monochromator means, the dispersed light from the first monochromator means being successively reflected by said surfaces to reverse the sense of the first dispersion with respect to the sense of the curvature of said curved first image, the curvature of the second image being substantially independent of wavelength.

17. Apparatus for producing a portion of a spectrum, comprising, in combination:
means forming a curved entrance slit for admitting light from a source, the entrance slit having a substantial length in comparison with its width;
means forming a curved exit slit;
first monochromator means including a first collimating mirror, a first diffraction grating and a first telescope mirror, light from the entrance slit being received by the first collimating mirror and being directed to the first diffraction grating for a first dispersion and then to the first telescope mirror, to form a curved first image of the entrance slit, the first diffraction grating tending to change the width of the first image with respect to the width of the entrance slit;
second monochromator means including a second collimating mirror, a second diffraction grating and a second telescope mirror, light from the first monochromator means being received by the second collimating mirror and being directed to the second diffraction grating for a second dispersion in additive relationship with the first dispersion, then to the second telescope mirror, and then toward the exit slit, to thereby form a curved second image at the exit slit, the second diffraction grating offsetting the tendency of the first diffraction grating to change the width of the first image; and
mirror means including a convex reflecting surface and a concave reflecting surface respectively positioned in spaced relationship with each other a short distance in front of and in back of the curved first image formed by the first monochromator means, the dispersed light from the first monochromator means being successively reflected by said surfaces to reverse the sense of the first dispersion with respect to the sense of the curvature of said curved first image, the curvature of the final image being substantially independent of wavelength.

18. Apparatus for producing a portion of a spectrum, comprising, in combination:

means forming a curved entrance slit for admitting light from a source, the entrance slit having a substantial length in comparison with its width;

means forming a curved exit slit;

first monochromator means including a first collimating mirror, a first diffraction grating and a first telescope mirror, light from the entrance slit being received by the first collimating mirror and being directed to the first diffraction grating for a first dispersion and then to the first telescope mirror, to form a curved first image of the entrance slit, the first diffraction grating tending to change the width of the first image with respect to the width of the entrance slit;

second monochromator means including a second collimating mirror, a second diffraction grating and a second telescope mirror, light from the first monochromator means being received by the second collimating mirror and being directed to the second diffraction grating for a second dispersion in additive relationship with the first dispersion, then to the second telescope mirror, and then toward the exit slit, to thereby form a curved second image at the exit slit, the second diffraction grating offsetting the tendency of the first diffraction grating to change the width of the first image;

light directing means having a pair of flat diagonal mirrors for coupling the first monochromator means with the second monochromator means; and mirror means including a pair of angularly disposed curved reflecting surfaces respectively positioned in spaced relationship with each other a short distance in front of and in back of the curved first image formed by the first monochromator means, the dispersed light from the first monochromator means being successively reflected by said surfaces to reverse the sense of the dispersion without reversing the curvature of said curved first image, the light leaving the curved reflecting surfaces being on the same side of the curved reflecting surfaces 19. Apparatus as defined in claim 18, in which each of the collimating and telescope mirrors in the two monochromators is spherically concave.

20. Apparatus as defined in claim 18, in which each of the collimating and telescope mirrors in the two monochromators comprises an off-axis section of a paraboloid.

21. Apparatus for producing a portion of a spectrum, comprising, in combination:

means forming a curved entrance slit for admitting light from a source, the entrance slit having a substantial length in comparison with its width;

means forming a curved exit slit;

first monochromator means including a first collimating mirror, a first diffraction grating and a first telescope mirror, light from the entrance slit being received by the first collimating mirror and being directed to the first diffraction grating for a first dispersion and then to the first telescope mirror, to form a curved first image of the entrance slit, the principal rays of the incident and dispersed light at the first diffraction grating lying in a first substantially flat plane and the first diffraction grating tending to change the width of the first image with respect to the width of the entrance slit;

second monochromator means including a second collimating mirror, a second diffraction grating and a second telescope mirror, light from the first monochromator means being received by the second collimating mirror and being directed to the second diffraction grating for a final dispersion in additive relationship with the first dispersion, then to the second telescope mirror, and then towards the exit slit, to thereby form a curved second image at the exit slit, the principal rays of the incident and dispersed light at the second diffraction grating lying in a second substantially flat plane which is spaced from and parallel to said first plane, the second diffraction grating offsetting the tendency of the first diffraction grating to change the width of the first image;

mirror means including a convex reflecting surface and a concave reflecting surface respectively positioned in spaced relationship with each other a short distance in front of and in back of the curved image formed by the first monochromator means, the dispersed light from the first monochromator means being successively reflected by said surfaces to reverse the sense of the dispersion with respect to the curvature of said curved first image, the light leaving the curved reflecting surfaces being on the same side of the curved reflecting surfaces as the light approaching the curved reflecting surfaces; and light directing means having a pair of flat diagonal mirrors for coupling the dispersed light of the first monochromator means with the mirror means and with the second monochromator means.

22. Apparatus as defined in claim 21, in which the radius of curvature of the exit slit is larger than the radius of curvature of the entrance slit by a distance equal to the spacing between the curved reflecting surfaces.

* * * * *